G. R. RICH.
PISTON.
APPLICATION FILED MAY 15, 1915.
1,168,551.
Patented Jan. 18, 1916.
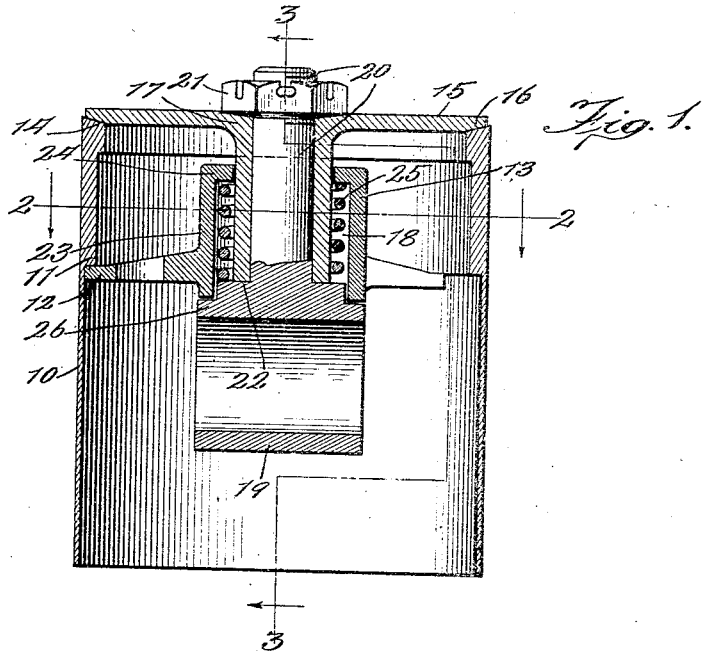
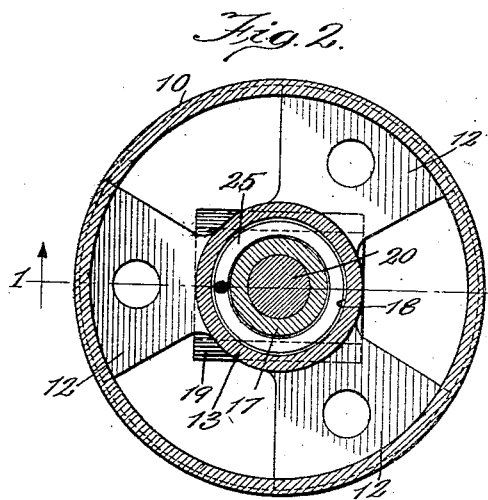
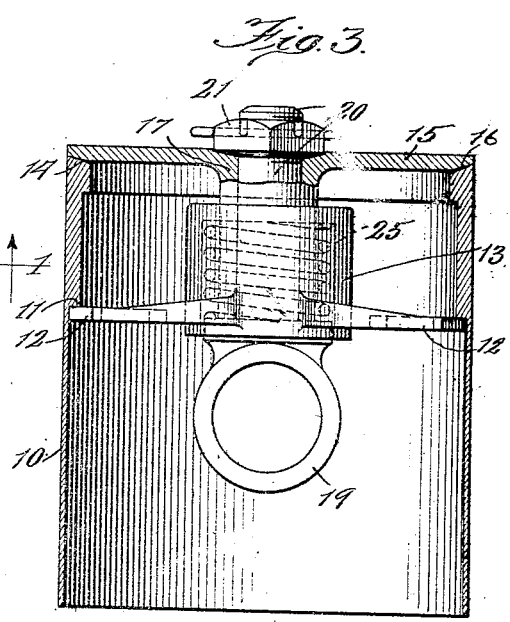
Witnesses:
Inventor:
George R. Rich,
By Charles O. Sherry
Atty.

UNITED STATES PATENT OFFICE.

GEORGE ROBERT RICH, OF OAK PARK, ILLINOIS, ASSIGNOR TO RICH TOOL COMPANY, OF CHICAGO, ILLINOIS, A CORPORATION OF ILLINOIS.

PISTON.

1,168,551.            Specification of Letters Patent.     Patented Jan. 18, 1916.

Application filed May 15, 1915. Serial No. 28,256.

*To all whom it may concern:*

Be it known that I, GEORGE R. RICH, a citizen of the United States, and a resident of Oak Park, county of Cook, and State of Illinois, have invented certain new and useful Improvements in Pistons, of which the following is declared to be a full, clear, and exact description.

This invention relates to pistons, and has especial reference to pistons adapted for use in internal combustion engines, but their use is not limited thereto, as they are capable of use in connection with other motors where high temperatures are developed in the operation of the same.

The principal object of this invention is to provide a piston constructed in such manner that the usual piston rings may be dispensed with, if desired, and capable of fitting the bore of the cylinder more closely than the pistons of ordinary type.

It is well-known that heretofore considerable clearance has been left between pistons and the internal cylinder walls to allow for expansion of the piston, due to the high temperatures developed at the head of the piston. There is a serious objection to engine constructions in which there is as much as seven to ten thousandths of an inch clearance between the piston and cylinder, because the piston wabbles and runs loosely in the cylinder when cold, usually causing such wear on the cylinder wall, as to change its cylindrical form to an oval form in cross section.

With my improved piston only sufficient clearance may be left between the piston and internal cylinder wall to permit passage of lubricating oil, say, for instance, two or three thousandths of an inch clearance, and when a film of oil is confined between the piston and cylinder wall, it is scarcely possible to detect any lateral play between the two, especially when in operation.

This invention consists in a piston having a piston head, capable of expanding independently of the body of the piston, and of slightly less diameter than said body, and suitable means for connecting together the head and body.

The invention further consists in the several novel features hereinafter set forth and claimed.

The invention is clearly illustrated in the accompanying drawing, in which:

Figure 1 is a central, vertical section through a piston embodying a simple form of the present invention; Fig. 2 is a horizontal section taken on the line 2—2 of Fig. 1; and Fig. 3 is a vertical section taken on the line 3—3 of Fig. 1, but showing the piston head expanded.

In the embodiment of the invention illustrated in said drawing, 10 designates the cylindrical wall or body of the piston, which body may be open at top and bottom. Conveniently, the wall, 10, may be thickened near its upper end to provide a shoulder, 11, against which bears the foot or flanges, 12, of a spring-abutment member, 13; the upper edge of said wall, 10, is preferably tapered downwardly and inwardly to provide a tapered seat, 14, for the piston head, 15, to seat upon, said head also being tapered at its peripheral edge to fit the tapered seat, 14. The piston head, 15, is of slightly less diameter than the outside diameter of the piston body, 10, to allow for expansion, independent of the piston body. Preferably, said piston head is of flat, disk-like form and has a centrally disposed, tubular sleeve or stem, 17, formed thereon, which projects into the interior of the piston body, 10, and into a compression spring chamber, 18, of the spring-abutment member, 13. Said tubular stem or sleeve, 17, may, however, be dispensed with, if so desired. The piston head may be connected to the wrist-pin-bearing member, 19, by a stud or pin, 20, although not necessarily so, and said stud or pin, 20, projects up through the tubular stem or sleeve, 17, and piston head, and is secured to said head by suitable means, here shown to comprise a nut, 21, threaded upon the screw-threaded end of the stud or pin, 20, and bearing against the piston head. The stud may have a radial hole formed therein and the nut may have a number of oppositely disposed, radial notches formed therein, any pair of which, when in register with the hole in the stud or pin, may receive a cotter pin or the like for locking the nut in place. Preferably, the lower face of the nut is tapered and fits upon a tapered seat on the top of the piston head. The lower end of the tubular stem or sleeve, 17, bears against a shouldered portion, 22, of the wrist-pin-bearing member, 19, and by screwing the nut, 21, down on the piston head, the wrist-pin-bearing member and piston head may be rigidly connected together. The connecting rod (not shown) may be connected to the wrist pin-bearing member, 19, by a wrist pin (not shown) in any of the ordinary and well-known ways.

The spring-abutment member, 13, is shown as formed with a housing, the tubular wall, 23, of which has an inturned, annular flange, 24, upon its upper end which forms a shoulder or abutment for a coiled compression spring, 25, whose other end bears against the shoulder, 22, of the wrist-pin-bearing member, 19, and is confined under compression between said shoulders, 22, 24; a slight space is left between the bottom of the wall, 23, and top, 26, of the wrist-pin-bearing member, 19, to permit a slight rise of said member, 19, whenever the piston head expands and rides upon the tapered seat, 14, on the wall, 10.

In use the piston is fitted to the bore of a cylinder, clearance being left for the passage of lubricating oil and it is connected to the connecting rod by the wrist pin, as usual. The engine or motor being started, heat is quickly developed at and above the piston, especially when used in an internal combustion engine; the piston head is, however, free to expand without carrying with it the side wall of the piston, since it is not fixedly or integrally connected therewith. As it expands and rides up the tapered seat, 14, it draws the wrist-pin-bearing member, 19, upward against the spring, 25, and further compresses the same, the effect being that the piston head is held tight on its seat. The diameter of the piston head should be so proportioned with respect to that of the piston body, that when expanded to its maximum extent, it comes flush with the outer face of the piston wall, but not beyond it. Heat will, of course, be conducted down into the wall of the piston body, but much of this heat is absorbed by the surrounding cylinder wall and water jacket employed in water-cooled internal combustion engines.

I am aware that more or less variation of the exact details of construction is possible without departing from the principle of my invention, and I desire, therefore, not to limit myself to the exact form of construction shown and described, but intend in the following claims to point out all of the invention disclosed herein.

I claim as new and desire to secure by Letters Patent:

1. A piston for motors, comprising a hollow piston body having an annular seat upon one end, a piston head of less diameter than said body, seated upon said annular seat, and means for holding said piston head on said seat.

2. A piston for motors, comprising a hollow piston body having an annular tapered seat on one end, a disk-like piston head having its edge portion tapered to fit and seat upon said seat of the piston body, said piston head being of less diameter than that of the piston body, a shouldered stem secured to said piston head, an abutment member for a spring in the hollow of said piston body, and a coiled compression spring confined under compression between said shouldered stem and abutment member for holding said head on the seat of said body.

3. A piston for motors, comprising a hollow piston body having an annular tapered seat on one end, a disk-like piston head of less diameter than said piston body having a tapered edge portion seated on said seat of the piston body, a wrist-pin-bearing member having a stem fixedly secured to said piston head, a spring-abutment member in the hollow of said piston body, and a coiled compression spring confined under compression between said wrist-pin-bearing member and abutment member, said spring acting to hold said piston head on the seat of said piston body.

4. A piston for motors, comprising a hollow piston body having an annular seat at one end, a disk-like head of less diameter than said piston body, seating upon said seat of the piston body, a wrist-pin-bearing member having a stem rigidly secured to said piston head, a spring-abutment member bearing against a shoulder on the internal wall of the piston body and having a housing surrounding said stem and formed with an inturned flange, and a coiled compression spring confined under compression between said wrist-pin-bearing member and the inturned flange of said housing, said spring acting to hold said piston head upon the seat of the piston body.

5. A piston for motors, comprising a hollow piston body formed with an annular internal shoulder, and formed with a tapered annular seat at one end, a disk-like piston head of less diameter than that of said piston body, having a tapered edge portion seating upon said tapered seat of the piston body and formed with a centrally disposed sleeve-like member projecting into the hollow of the piston body, a wrist-pin-bearing member having a shouldered portion, and having a stem extending up through said sleeve and fixedly secured to said piston head, a spring-abutment member bearing against said shoulder of the piston body and having a housing surrounding said sleeve and formed with an inturned flange, and a coiled compression spring surrounding said sleeve and confined in said housing between its inturned end and the shoulder of the wrist-pin-bearing member, said spring acting to hold said piston head upon the seat of the piston body.

6. A piston for motors, comprising a hollow piston body having a tapered seat on one end, a piston head of less diameter than that of said piston body and having a tapered edge portion seating upon said seat of the piston body and formed with a centrally disposed sleeve, projecting into the hollow of said piston body, a wrist-pin-bearing member having a shoulder and having a screw-threaded stem projecting through said sleeve and piston head, a nut threaded upon said screw-threaded stem and bearing against the outer face of the piston head, a spring-abutment member in the hollow of said piston body and bearing against said body and having a housing surrounding said sleeve and formed with an inturned flange, and a coiled compression spring surrounding said sleeve and confined under compression between the shouldered portion of the wrist-pin-bearing member and the inturned flange of the housing.

7. A piston for motors, comprising a hollow piston body, an independent expansible piston head of less diameter than that of said piston body, and yielding connecting means between said body and head.

8. A piston for motors, comprising a hollow piston body, an independent expansible piston head of less diameter than that of the piston body, yielding means for holding said piston head upon said body, and a wrist-pin-bearing member fixedly secured to said head.

9. A piston for motors, comprising a hollow piston body, an independent, expansible piston head of less diameter than that of the piston body, and means for holding said piston head upon said body.

GEORGE ROBERT RICH.